(12) United States Patent
Harada

(10) Patent No.: US 7,597,300 B2
(45) Date of Patent: Oct. 6, 2009

(54) CONTAINER HOLDING UNIT AND CUP HOLDER DEVICE

(75) Inventor: Akinori Harada, Fujisawa (JP)

(73) Assignee: Nifco Inc., Yokohama, Kanagawa (JP)

( * ) Notice: Subject to any disclaimer, the term of this patent is extended or adjusted under 35 U.S.C. 154(b) by 474 days.

(21) Appl. No.: 11/132,321

(22) Filed: May 19, 2005

(65) Prior Publication Data

US 2005/0279752 A1    Dec. 22, 2005

(30) Foreign Application Priority Data

Jun. 17, 2004    (JP) .............................. 2004-180268

(51) Int. Cl.
*A47K 1/08* (2006.01)
(52) U.S. Cl. .............. 248/311.2; 248/312.1; 248/316.3; 224/926; 220/737; 220/282; 297/188.14
(58) Field of Classification Search ............. 248/311.2, 248/312.1, 314, 316.3, 146, 346.04; 224/926; 220/737, 282; 297/188.14, 188.15
See application file for complete search history.

(56) References Cited

U.S. PATENT DOCUMENTS 6,860,457 B2 *    3/2005    Then et al. ............... 248/311.2

| 2004/0108428 A1 * | 6/2004 | Leopold | 248/311.2 |
| 2004/0118860 A1 * | 6/2004 | Leopold et al. | 220/737 |
| 2005/0224676 A1 * | 10/2005 | Stavermann | 248/311.2 |
| 2006/0043249 A1 * | 3/2006 | Han | 248/311.2 |
| 2006/0076468 A1 * | 4/2006 | Shin | 248/311.2 |

FOREIGN PATENT DOCUMENTS

| JP | 6-50969 | 7/1994 |
| JP | 6-78067 | 11/1994 |

* cited by examiner

*Primary Examiner*—J. Allen Shriver
*Assistant Examiner*—Todd M. Epps
(74) *Attorney, Agent, or Firm*—Manabu Kanesaka

(57) ABSTRACT

A container holding unit includes an abutting portion and an urging device for urging the abutting portion to a circumference of a container to constrain the container. The container holding unit further includes a case having a first guide grove and a second guide grove extending downwardly. The abutting portion includes a first shaft inserted in the first guide grove and a second shaft inserted in the second guide grove, so that the abutting portion slides relative to the case. The abutting portion is rotatable in a direction that a projecting amount of the abutting portion from the case decreases when an upward force is applied from below. The urging device urges the abutting portion in a direction that the abutting portion projects from the case, and in a direction that the abutting portion returns to an initial position.

7 Claims, 9 Drawing Sheets

CONTAINER HOLDING UNIT AND CUP HOLDER DEVICE

BACKGROUND OF THE INVENTION AND RELATED ART STATEMENT

The present invention relates to a container holding unit for holding a container such as a can, cup, and plastic bottle, and a cup holder device with the container holding unit.

Patent Reference 1 has disclosed a conventional cup holder device as shown in FIGS. 9(a) and 9(b). A cup holder device 50 includes a container holding portion 51; an abutting portion 53 (support) disposed in the container holding portion 51; and a spring device 54 for urging the abutting portion 53. In the container holding portion 51, a container is inserted from above into a relatively large recess portion 52 to support a bottom surface of the container. The abutting portion 53 is supported on an upper portion of a wall of the recess portion 52, and is urged by the spring device 54 in a direction that the abutting portion 52 projects upwardly from inside the recess portion 52.

When a small container A1 is inserted as shown in FIG. 9(a), the abutting portion 53 rotates downwardly a little against an urging force of the spring device 54, and abuts against a side of the container A1, so that the container A1 is held between the abutting portion 53 and a corresponding inner surface of the recess portion 52. When a large container A2 is inserted as shown in FIG. 9(b), the abutting portion 53 rotates downwardly to a large extent against the urging force of the spring device 54, and abuts against a side of the container A2, so that the container A2 is held between the abutting portion 53 and the corresponding inner surface of the recess portion 52.

Patent Reference 1: Japanese Utility Model Publication (Kokai) No. 06-50969.

In the cup holder device 50, the abutting portion 53 rotates downwardly against the urging force of the spring device 54 from a position substantially horizontal relative to a bottom surface of the recess portion 52. Accordingly, it is possible to hold containers with various diameters between the abutting portion 53 and the corresponding inner surface of the recess portion 52 not to move in a radial direction. However, the cup holder device 50 has the following disadvantages. In this structure, when the container having a small diameter like the container A1 is inserted, only a limited portion of an end of the abutting portion 53 contacts the container. When the container having a large diameter like the container A2 is inserted, a relatively large area of the end of the abutting portion 53 contacts the container. Accordingly, depending on a diameter of the container, it may be easy or difficult to insert and hold the container. For example, it is necessary to insert and take out the container with a large diameter like the container A2 with a large force.

When the container has a small diameter portion a or a dimple in a circumference thereof as shown in FIG. 9(a), the end of the abutting port-ion 53 may be, hooked at the small diameter portion a upon taking out. Further, the cup holder device needs to have a proper appearance as an interior device, and needs to be easily assembled.

In view of the problem described above, an object of the present invention is to provide a cup holder device, in which it is easy to insert and hold containers with various diameters. When a container has a small diameter portion or a dimple, an abutting portion is not hooked, thereby maintaining easy operation. It is also easy to handle and install to a container holding portion of a device.

Further objects and advantages of the invention will be apparent from the following description of the invention.

SUMMARY OF THE INVENTION

In order to achieve the objects described above, according to a first aspect of the present invention, a container holding unit includes an abutting portion and an urging device for urging, so that the abutting portion abuts against a circumference of a container to constrain the container in a radial direction. The container holding unit further includes a case having a first guide groove and a second guide groove extending gradually and downwardly from a front side toward a rear side. The abutting portion includes a first shaft inserted in the first guide groove and a second shaft inserted in the second guide groove, so that the abutting portion slides relative to the case. The abutting portion is arranged to be rotatable in a direction that the abutting portion projects from the case to a less extent when an upward force is applied from below. The urging device urges the abutting portion in a direction that the abutting portion projects from the case, and in a direction that the abutting portion returns to an initial position.

According to the present invention, a cup holder device includes at least one cup holding unit described above, so that the cup holding unit supports a bottom surface of the container when the container is inserted from above.

In the cup holding unit of the present invention, when the container is inserted, the abutting portion slides inside the case downwardly and obliquely against an urging force of the urging device. Accordingly, the abutting portion abuts against the circumference of the container at a same location thereof regardless of a size of the container. As compared with a conventional structure, it is possible to hold the container with a constant force regardless of a size of the container, thereby making it easy to insert and hold the container all the time.

In a case that the container has a small diameter portion (dimple), when the container is taken out and the abutting portion faces the small diameter portion of the container, the abutting portion slides and projects with the urging force of the urging device. Accordingly, an end of the abutting portion engages the small diameter portion. Then, the abutting portion rotates and retracts due to a reaction force or friction from the container, so that the end moves out the small diameter portion. Accordingly, it is possible to prevent the abutting portion from hooking the small diameter portion.

In the present invention, the cup holding unit is assembled as a unit, thereby improving an appearance of the cup holder device. It is easy to handle and install the container holding unit into the cup holder device. The cup holder device has advantages same as those of the cup holding unit.

In addition to the advantages of the cup holding unit, as compared with a conventional structure, it is possible to hold the container with a constant force regardless of a size of the container, so that it is easy to insert and hold all the time. In a case that the container has a small diameter portion (dimple), it is possible to prevent the abutting portion from hooking the small diameter portion, thereby improving operation and an appearance.

In the invention, the abutting portion abuts against the circumference of the container at a corner of a triangle portion thereof. When the container is taken out and the abutting portion rotates due to a load, a side situated downwardly and obliquely moves to a substantially vertical position. Accordingly, it is easy to insert and hold all the time.

In the invention, the guide grooves have appropriate shapes and are arranged at appropriate positions, so that the abutting portion moves as described above. It may be arranged such that the abutting portion slides against an urging force of a first urging device, and rotates against an urging force of a second urging device. Accordingly, it is possible to obtain a smooth sliding movement without increasing the number of the urging devices. The cup holder device has the advantages same as those of the container holding unit, thereby improving operation and reliability.

BRIEF DESCRIPTION OF THE DRAWINGS

FIGS. 4(a) and 4(b) are views showing the container holding unit shown in FIG. 2, wherein FIG. 4(a) is a side view thereof and FIG. 4(b) is a front view thereof;

DETAILED DESCRIPTION OF PREFERRED EMBODIMENTS

Figure 1:
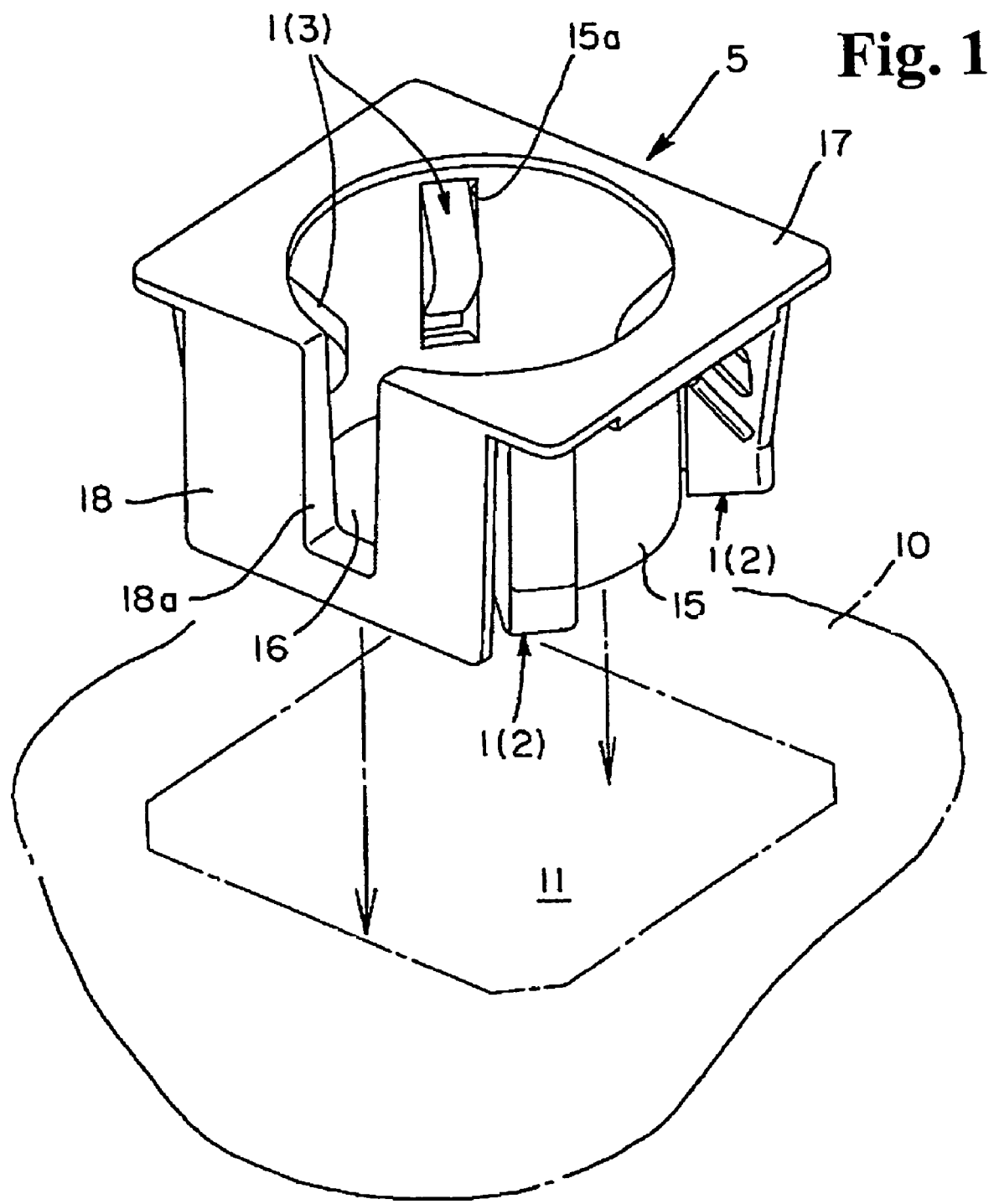
FIG. 1 is a schematic view showing a cup holder device according to the present invention.
Figure 2:
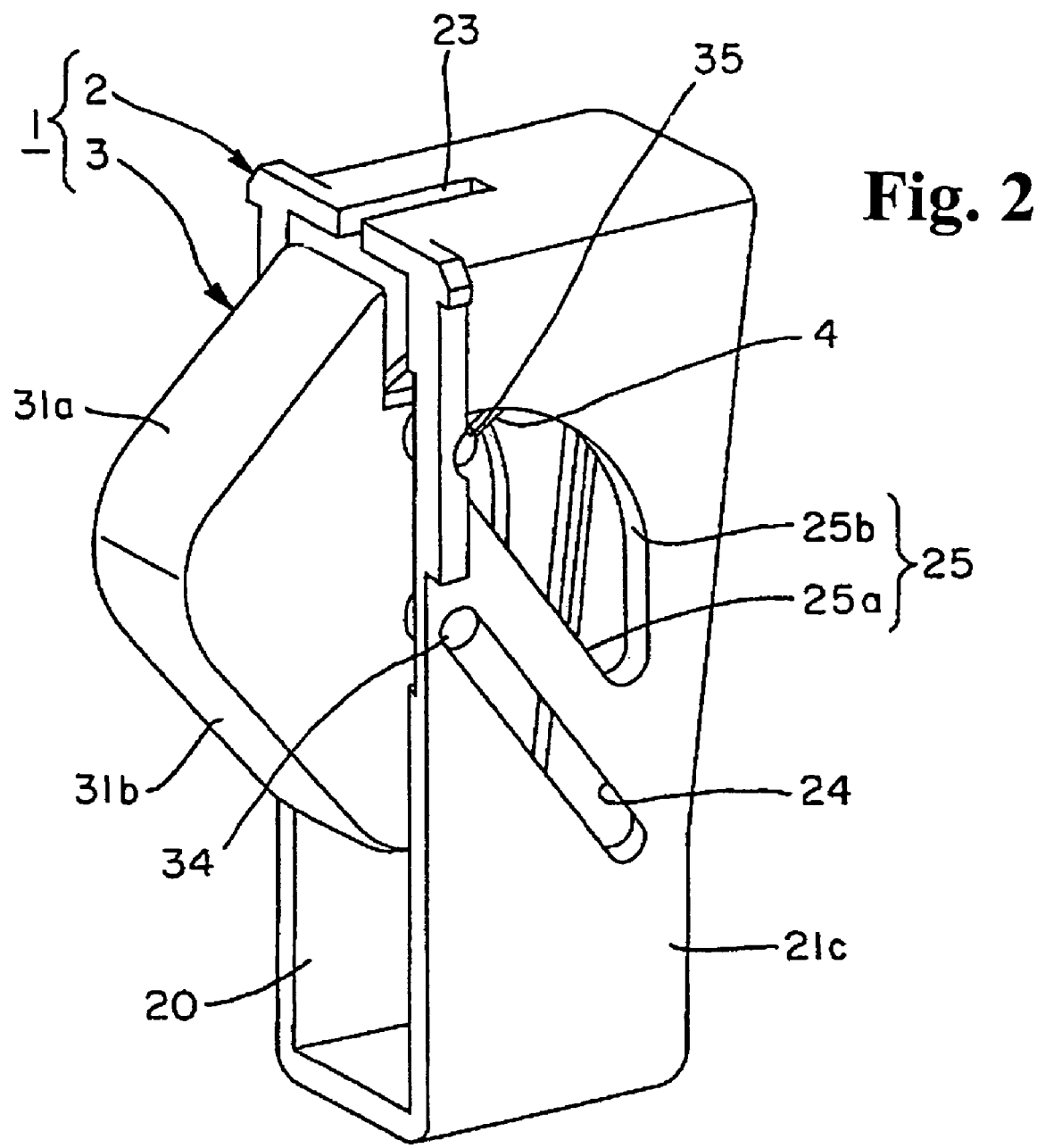
FIG. 2 is a perspective view showing a container holding unit according to a first embodiment of the present invention.

Hereunder, embodiments of the present invention will be described with reference to the accompanying drawings. FIGS. 1 to 6(c) show a basic structure, and FIGS. 7 to 8(b) show a modified structure. In the modified structure shown in FIGS. 7 to 8(b), guide grooves formed in a case are modified. Accordingly, other components same as those of the basic structure are designated by the same reference numerals and explanations thereof are omitted.

As shown in FIGS. 1 to 4(b), a container holding unit 1 includes a case 2 with first guide grooves 24 and second guide grooves 25; an abutting portion 3; and an urging device 4 for urging the abutting portion 3. The abutting portion 3 includes first shafts 34 inserted in the first guide grooves 24 and second shafts 35 inserted in the second guide grooves 25, so that the abutting portion 3 slides relative to the case 2. The abutting portion 3 is arranged to be rotatable in a direction that the abutting portion 3 projects from the case 2 to a less extent when an upward force is applied from below. The urging device 4 urges the abutting portion 3 in a direction that the abutting portion 3 projects from the case 2, and in a direction that the abutting portion 3 returns to an initial position after the abutting portion 3 rotates.

The container holding unit 1 is installed in a cup holder device 5 as a constituent member thereof. In the cup holder device 5, a container is inserted downwardly from above, and a container holding portion 15 supports a bottom surface of the container. At least one container holding unit 1 is disposed relative to the container holding portion 15. The abutting portion 3 abuts against a circumference of the container, so that the container is constrained in a radial direction. Accordingly, it is possible to hold various containers from a container A1 with a small diameter to a container A2 with a large diameter.

The case 2 has a substantially rectangular shape extending in a vertical direction, and has an opening in a front surface 21a. An interior 20 of the case 2 is defined by a rear surface 21b, side surfaces 21c, an upper surface 21d, and a bottom surface 21e. The side surfaces 21c are provided with attaching pieces 22 projecting from upper ends thereof, and first guide grooves 24 and second guide grooves 25 formed in central portions thereof in a vertical direction.

The first guide grooves 24 and second guide grooves 25 have different shapes, and extend downwardly toward a front side. The first guide grooves 24 have a linear shape and a small constant width. The second guide grooves 25 are arranged above the first guide grooves 24, and have a width having a wide portion at the middle in a lateral direction. That is, the second guide grooves 25 have lower portions 25a extending in parallel to the first guide grooves 24 and upper portions 25b with a circular shape. A slit 23 is formed in the upper surface 21b for positioning and expanding, and may be omitted. A vertical groove 26 is formed in an inner surface of the rear surface 21b and extends in the vertical direction for guiding a portion 43 of the urging device 4 (described later).

The abutting portion 3 has a rectangular shape in a side view. An interior 30 of the abutting portion 3 is defined by sides 31a and 31b of a corner portion or an arrow portion, a bottom side 31c with an opening, and two side surfaces 32. The sides 31a and 31b are joined at the corner portion, and usually the corner portion contacts the circumference of the container. An escape groove 33 with a recess is formed in the bottom side 31c at one of the side surfaces 32. First shafts 34 and second shafts 35 project from outer surfaces of the side surfaces 32, respectively.

Figure 4A:
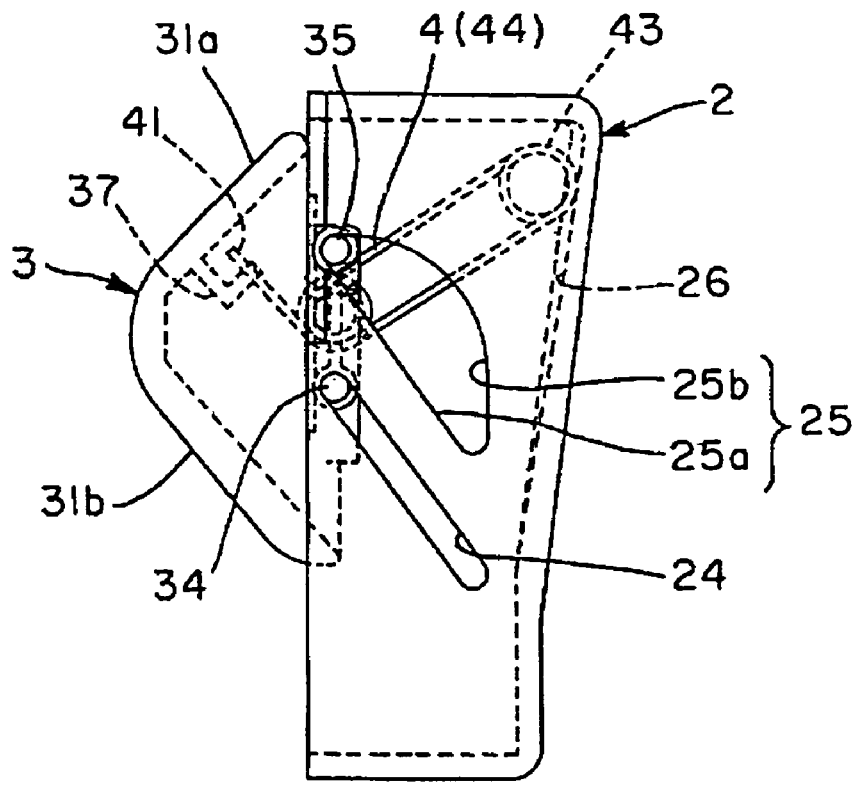
Figure 4B:
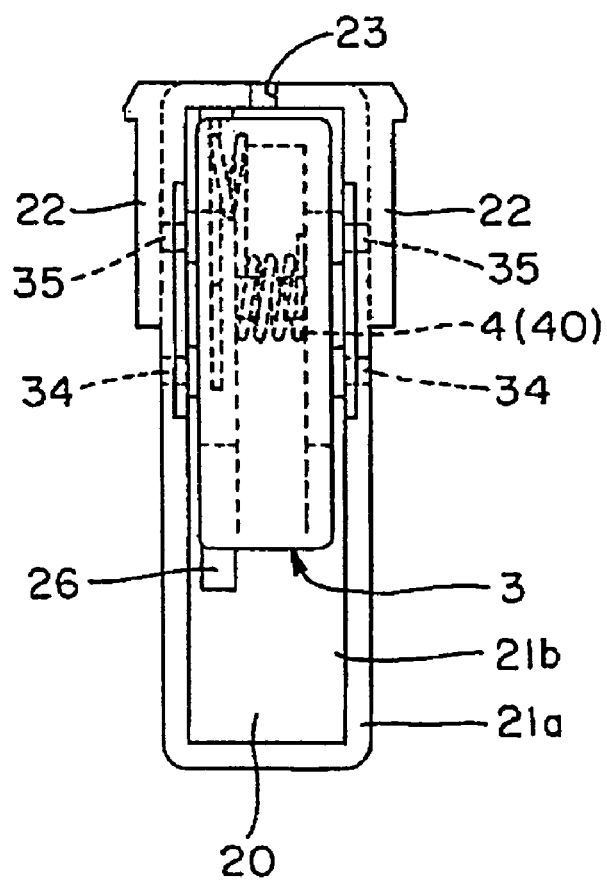

The first shafts 34 and second shafts 35 are arranged apart by a distance corresponding to a distance between the first guide grooves 24 and the lower portions 25a of the second guide grooves 25. Projections 36 are oppositely formed on inner surfaces of the side surfaces 32 at locations close to the bottom side 31c. As shown in FIG. 4(a), an engaging projection 37 projects from an inner surface of the side 31b. The engaging projection 37 is provided with an engaging groove for engaging an end portion 41 of the urging device 4.

The urging device 4 is a torsion spring type, and includes a large wound portion 40; the end portion 41 of the large wound portion 40; a first urging portion 42 with a linear shape extending from an end portion of the large wound portion 40; and a second urging portion 44 with a linear shape turning from an end portion of the first urging portion 42 through a small wound portion 43. An end portion of the second urging portion 44 is curved. The urging device 4 urges the abutting portion 3 in a direction that the abutting portion 3 projects from the case 2. It is possible to use a simple torsion spring without the large wound portion 40, the small wound portion 43, or the second urging portion 43. Alternatively, a coil spring, a leaf spring, or an elastic member such as rubber may be used, thereby eliminating the escape groove 33.

In an assembly process, first, the urging device 4 is supported on the abutting portion 3, and installed in the case 2 together with the abutting portion 3. That is, the wound portion 40 is compressed and inserted into the interior 30, and the projections 36 engage the wound portion 40, so that the urging device 4 is rotatably supported on the abutting portion 3. The end portion of the second urging portion 44 is rotatably fitted in the escape groove 33 at the bottom side 31c. In this case, the side surfaces 21c are expanded through the slit 23, and the first shafts 34 are fitted in the first guide grooves 24. Then, while the side surfaces 21c are expanded, the abutting portion 3 is inserted into the interior 20 with the first shafts 34 as pivots, thereby fitting the second shafts 35 into the second guide grooves 25.

As shown in FIG. 1, the container holding unit 1 thus assembled is installed in the cup holder device 5. The cup holder device 5 is provided with a cylindrical main body 15 for receiving the container on a bottom surface 16. The cup holder device 5 is entirely fitted in an installation hole 11 of an installation portion 10. The installation portion 10 includes a center consol or an arm rest of an automobile, and may be something else. The main body 15 is provided with installation windows 15a at four locations apart with a constant interval in a circumference direction. The main body 15 is also provided with a flange 17 projecting from an upper circumference thereof and plate portions 18 projecting downwardly from opposite sides of the flange 17. The container holding unit 1 is attached to the installation window 15a with the attaching pieces 22 of the case 2. In the embodiment, four container holding units 1 are installed in the main body 15, and at least one container holding unit 1 is sufficient.

Figure 5A:
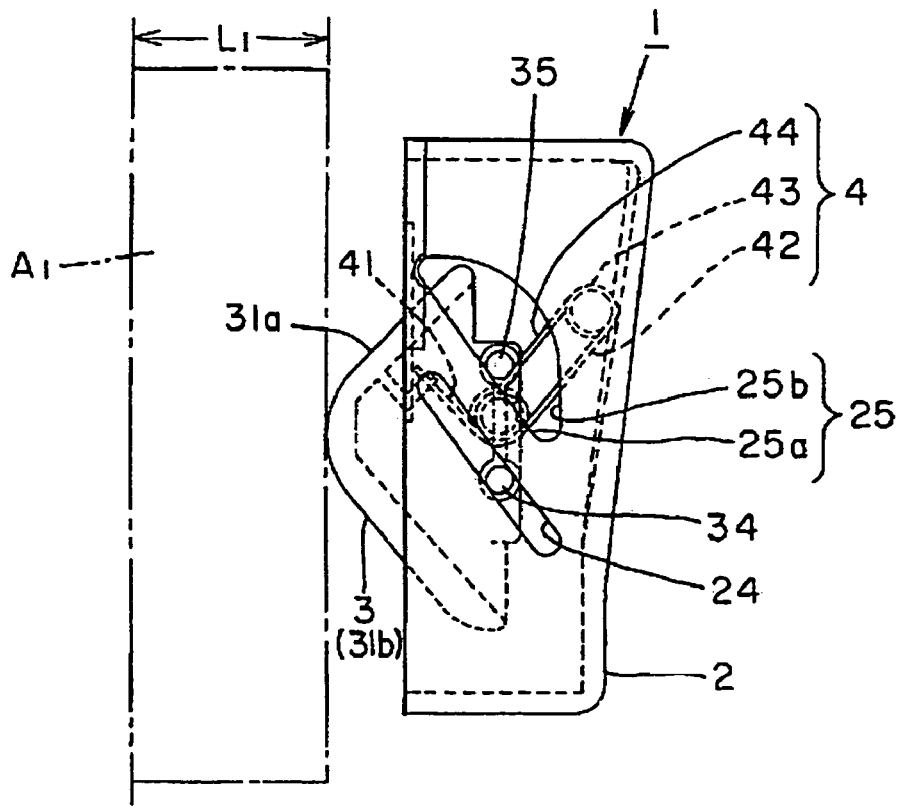
FIGS. 5(a) and 5(b) are views showing an operation of the container holding unit shown in FIG. 2.
Figure 5B:
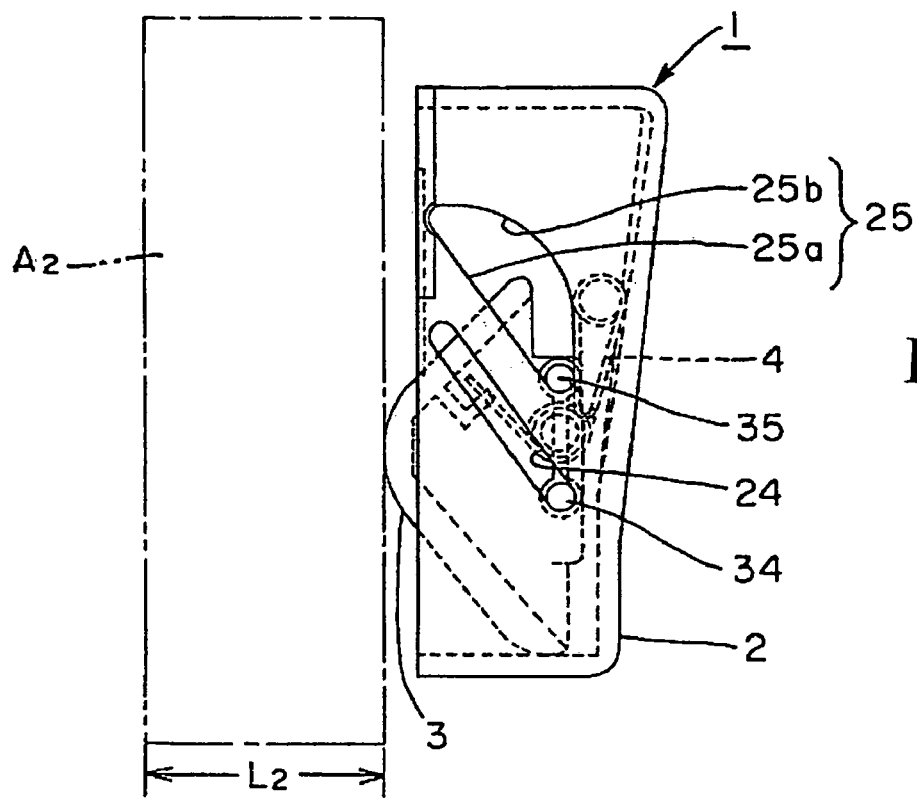

FIGS. 5(a) and 5(b) are views showing an operation of the container holding unit 1. FIG. 5(a) shows the container holding unit 1 holding the container A1 with a small diameter (radius L1), and FIG. 5(b) shows the container holding unit 1 holding the container A2 with a small diameter (radius L2). With this structure, when the containers A1 and A2 are inserted or taken out from the main body 15 of the cup holder device 1, the abutting portions 3 move relative to the cases 2 as follows.

FIG. 4(a) shows an initial non-use state in which the abutting portion 3 projects from the case 2 to a maximum extent. That is, the abutting portion-3 is pushed by the urging force of the urging device 4 (the end portion 41 and the first urging portion 42), and the shafts 34 and 35 slide up to front ends of the guide grooves 24 and 25. When the containers A1 and A2 are inserted into the main body 15 from the initial state, the containers A1 and A2 contact the upper sides 31a inclined downwardly. Accordingly, the containers A1 and A2 apply downward forces to the upper sides 31a, and the abutting portion 3 retracts into the case 2 against the urging force of the urging devices 4 while the first shafts 34 slide along the first guide grooves 24 and the second shafts 35 slide along the second guide grooves 25.

When the abutting portion 3 retracts so that the end portion thereof aligns with the diameters of the containers A1 and A2, the containers A1 and A2 are inserted further. FIGS. 5(a) and 5(b) show states that the abutting portion 3 retracts into the case 2, and the end portion thereof abuts against the circumferences of the containers A1 and A2 to restrain the same in the radial direction. In this structure, when the containers A1 and A2 are inserted or taken out, the end portion (the corners of the upper sides 31a and the lower sides 31b) always contacts the circumferences of the containers A1 and A2 regardless of a size of the containers A1 and A2. Accordingly, it is possible to stably hold the containers A1 and A2, and to smoothly take out the containers A1 and A2 without an excess load.

Figure 6A:
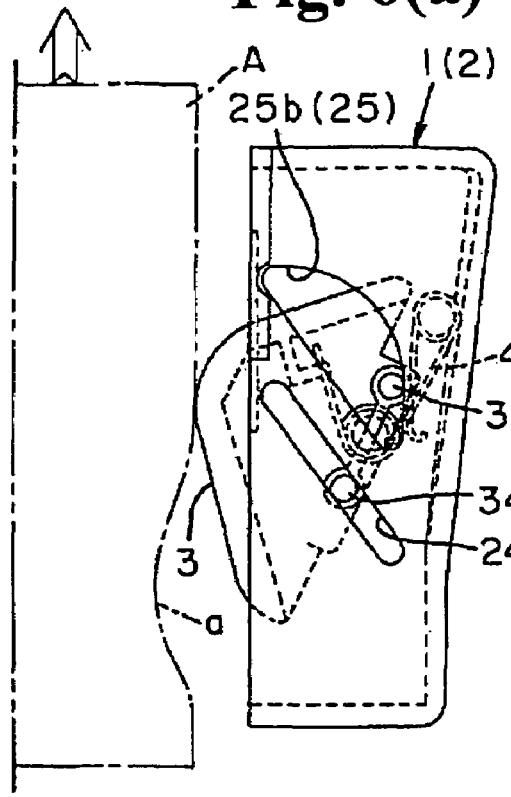
FIGS. 6(a) to 6(c) are views showing another operation of the container holding unit shown in FIG. 2.
Figure 6B:
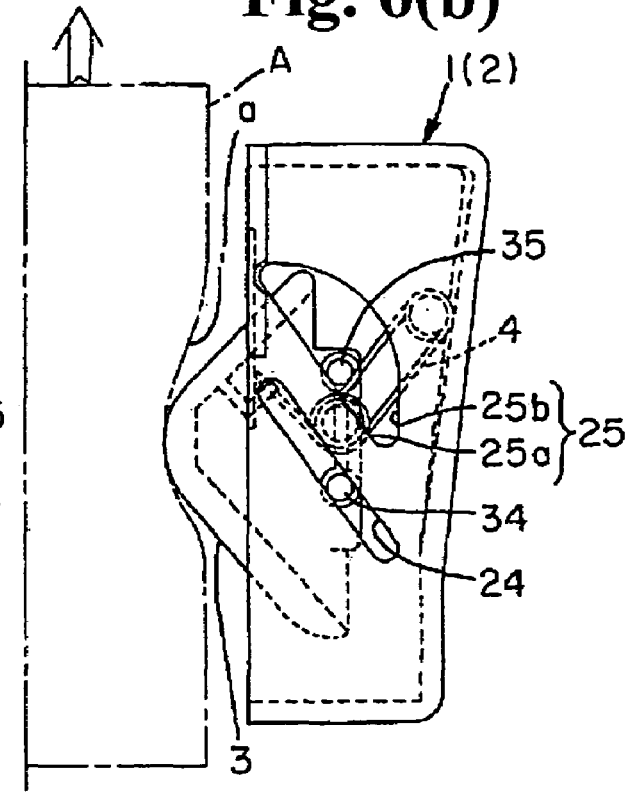
Figure 6C:
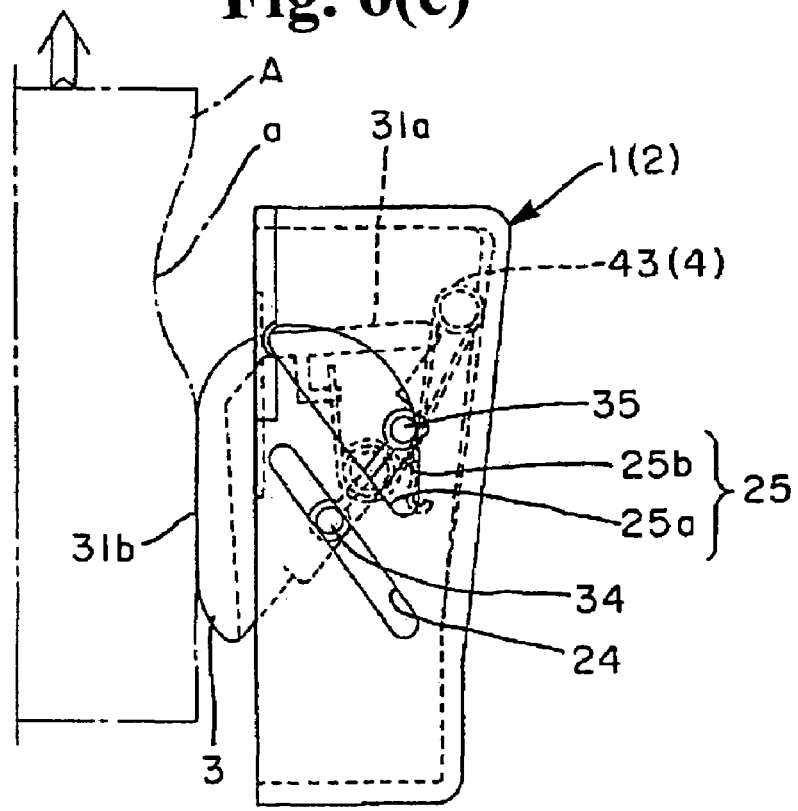
Figure 7:
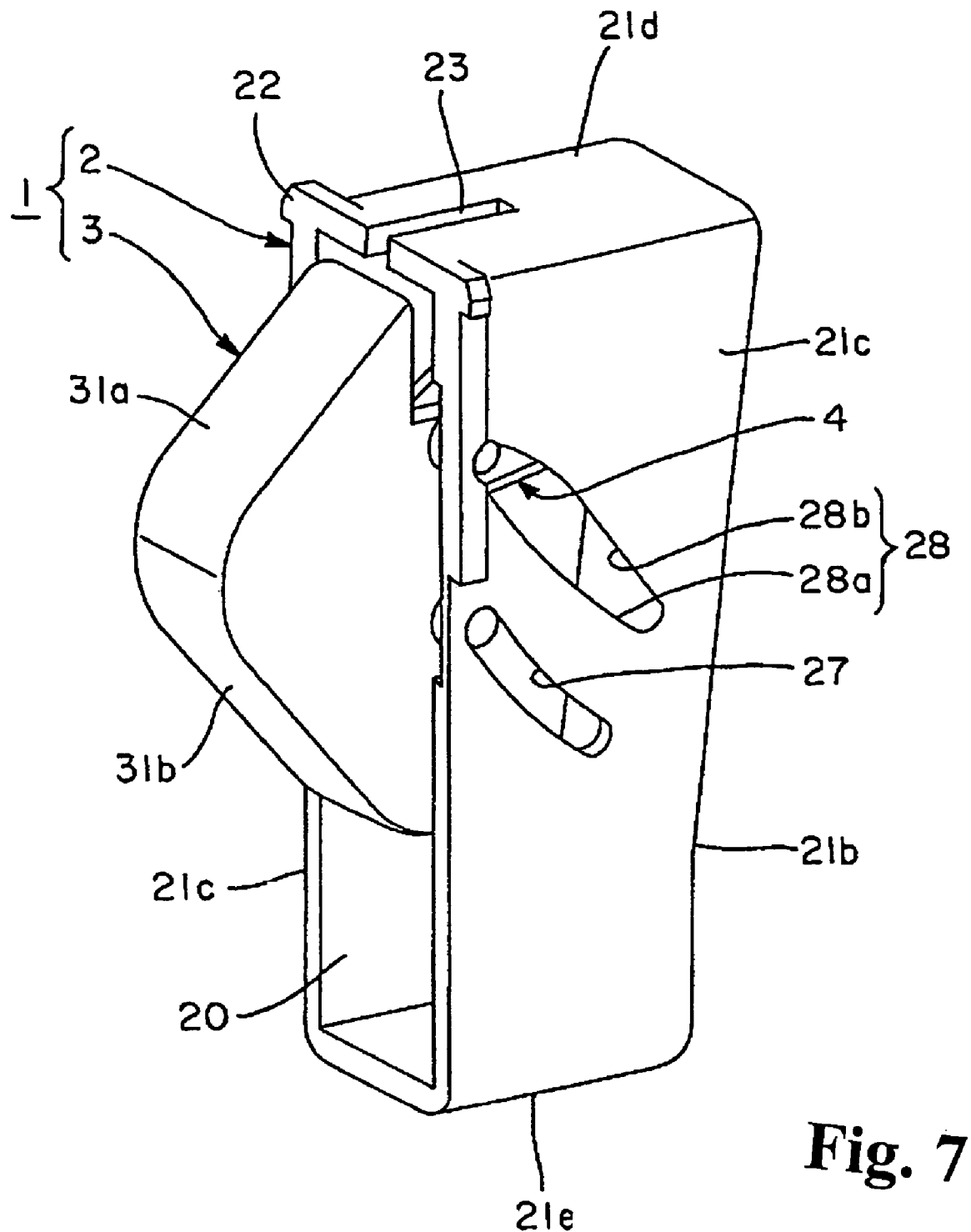
FIG. 7 is a view showing a container holding unit according to a second embodiment of the present invention.

FIGS. 6(a) to 6(c) are views showing an operation of the container holding unit 1 when a container having a small diameter portion (dimple) is pulled out. FIG. 6(a) shows a state that the container A is pulsed out up to a position where a small diameter portion a approaches the end portion of the abutting portion 3. FIG. 6(b) shows a state that the container A is pulsed out up to a position where the small diameter portion a engages the end portion of the abutting portion 3. FIG. 6(c) shows a state that the container A is pulsed out up to a position where the small diameter portion a passes the end portion of the abutting portion 3.

When the container A is pulled out quickly or obliquely, the second shafts 35 slightly rotate in the second guide grooves 25 with the first shafts 34 as pivots (the urging device 4 is charged) as shown in FIG. 6(a). Accordingly, it is possible to prevent the abutting portion 3 or the container A from receiving an excessive load. When the container A is pulled out normally (not quickly nor obliquely), the second shafts 35 do not rotate as shown in FIGS. 5(a) and 5(b), thereby making it possible to pull out the container in a posture same as that being held.

When the container A is pulled out up to a position shown in FIG. 6(b), the abutting portion 3 is reversed by the urging force, and the end portion of the abutting portion 3 engages the small diameter portion a. When the container A is further pulled out, the second shafts 35 greatly rotate in the second guide grooves 25 with the first shafts 34 as pivots (the urging device 4 is charged) as shown in FIG. 6(c). That is, the abutting portion 3 rotates in a direction that the abutting portion 3 projects from the case 2 to a less extent. Accordingly, the end portion of the abutting portion 3 escapes from the small diameter portion a, and the lower side 31b linearly contacts the circumference of the container A, so that the container A is easily pulled out. When the container A is completely pulled out, the abutting portion 3 is reversed with the urging force and returns to the initial state shown in FIGS. 4(a) and 4(b). Accordingly, it is possible to prevent the abutting portion 3 from hooking the small diameter portion a.

Figure 3:
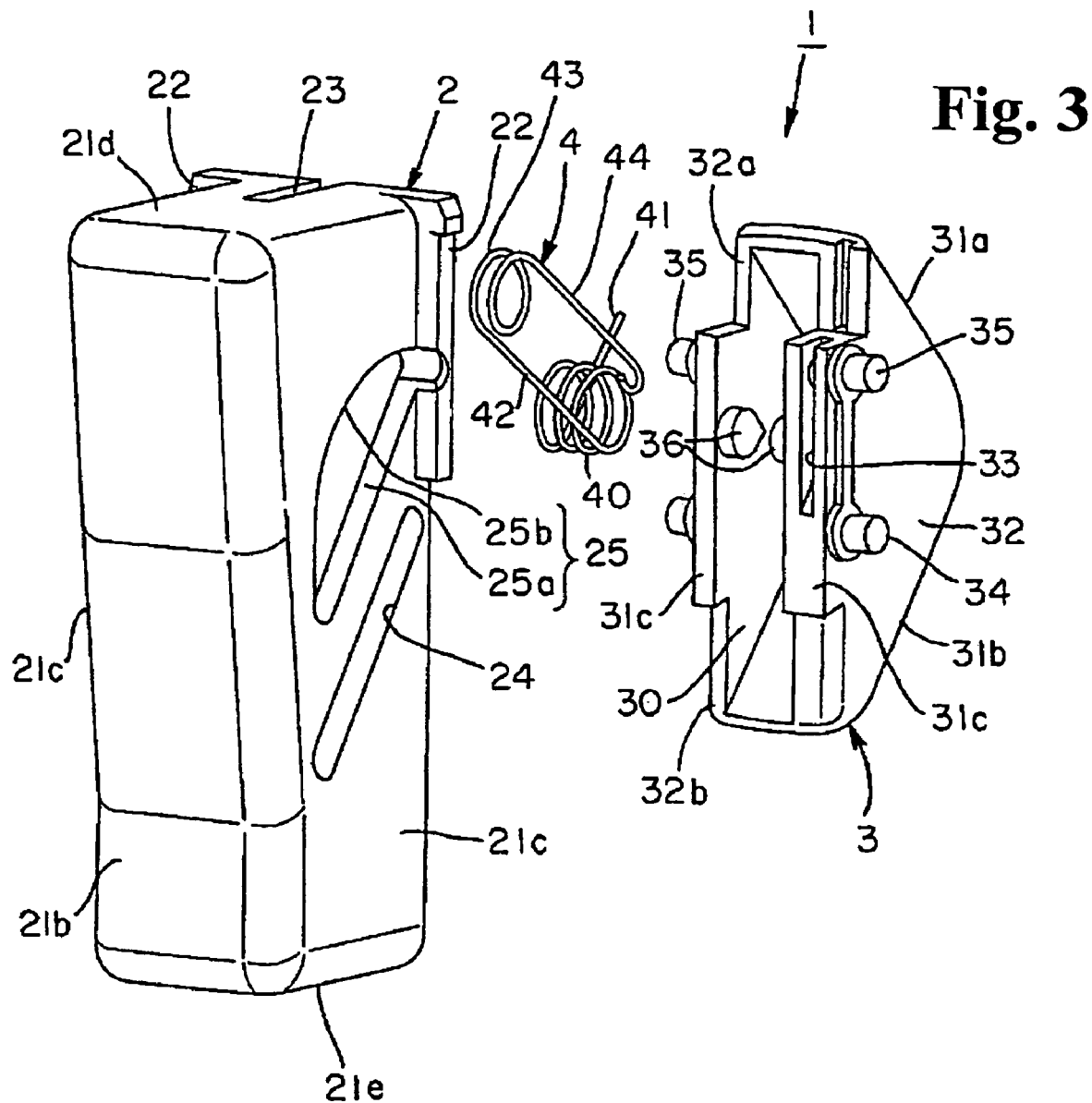
FIG. 3 is an exploded perspective view showing the container holding unit shown in FIG. 2.
Figure 8A:
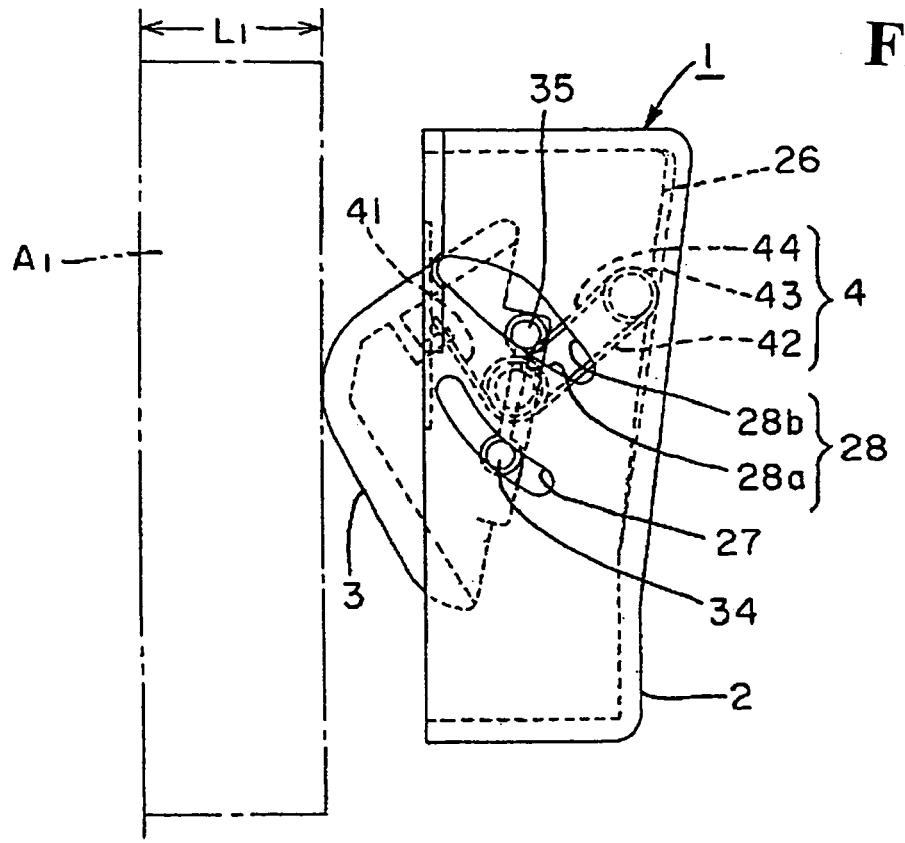
FIGS. 8(a) and 8(b) are views showing an operation of the container holding unit shown in FIG. 7.
Figure 8B:
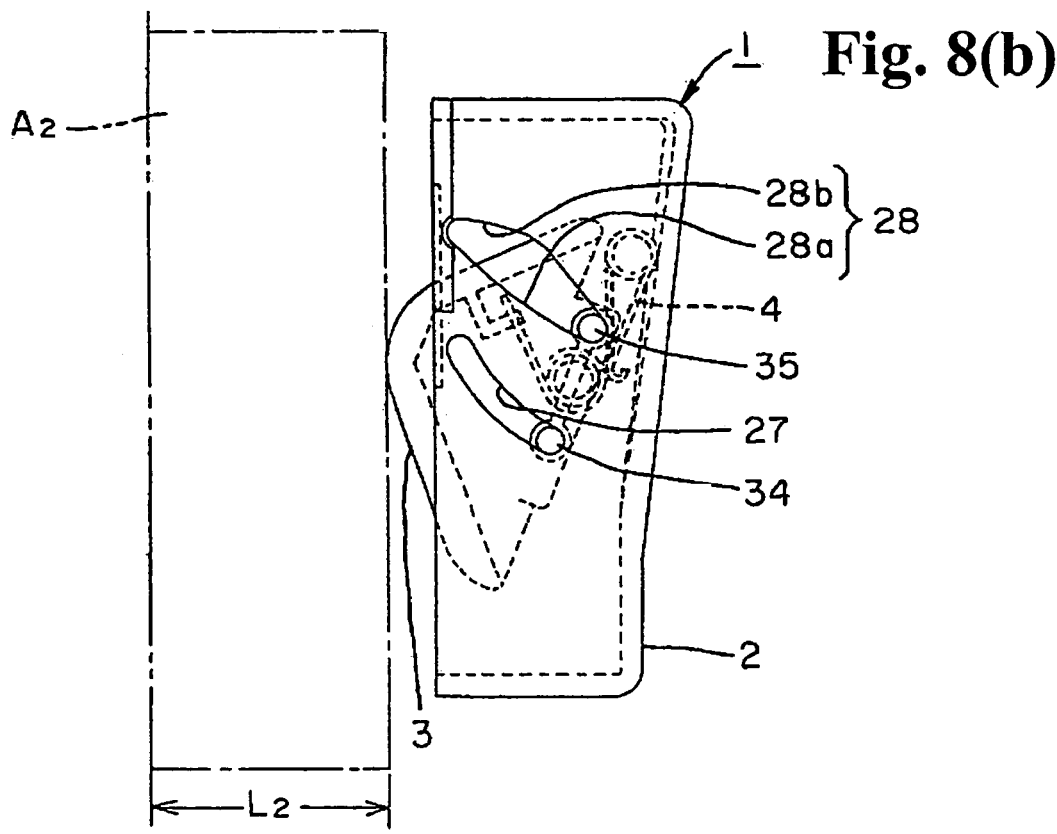
Figure 9A:
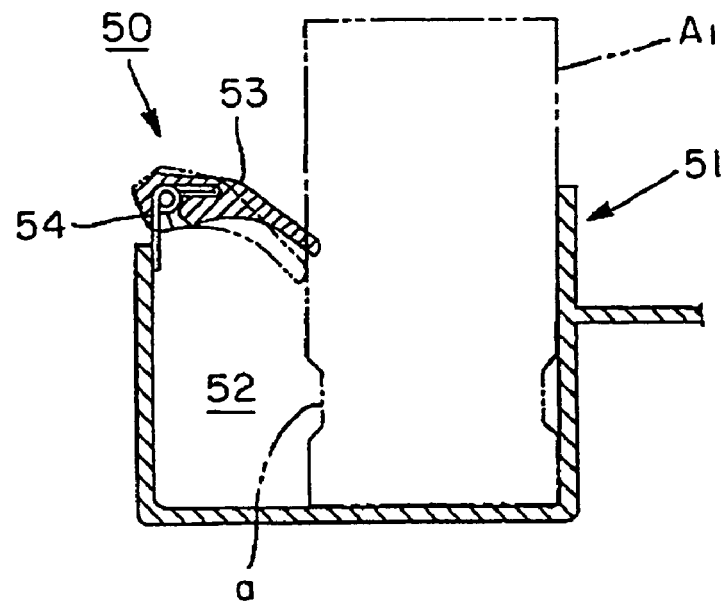
FIG. 9 is a schematic view showing a conventional cup holder device.
Figure 9B:
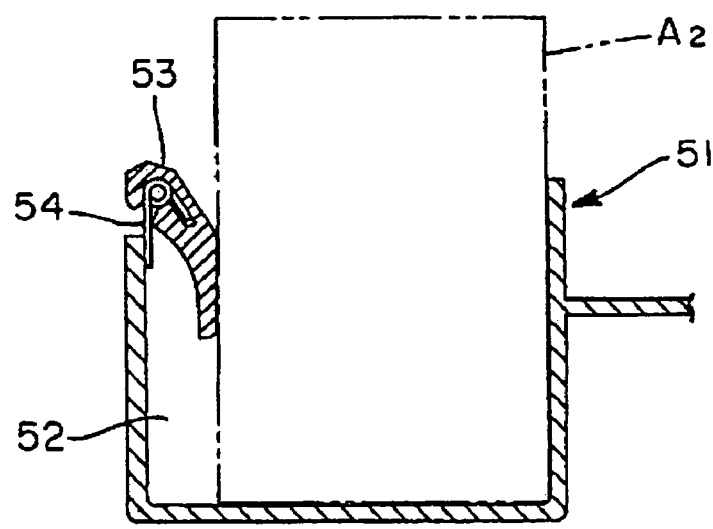

FIG. 7 corresponds to FIG. 3, and FIGS. 8(a) and 8(b) correspond to FIGS. 5(a) and 5(b). In the container holding unit 1, the case 2 has first-guide grooves 27 and second guide grooves 28 having shapes modified from those in the embodiment described above. That is, the first guide grooves 27 have a gently curved circular shape with a small uniform width. The second guide grooves 28 are arranged above the first guide grooves 27, and have a width having a wide portion at the middle in a lateral direction. More specifically, the second guide grooves 28 have lower portions 28a extending in parallel to the first guide grooves 27 and having a gently curved circular shape, and upper portions 25b with a sharply curved circular shape.

With this structure, the abutting portion 3 projects from the case 2 to a less extent. Accordingly, when the container A2 with a large diameter is inserted, the end portion of the abutting portion 3 contacts the container A2 at an upper position, thereby holding the container A2 more stably.

The disclosure of Japanese Patent Application No. 2004-180268, filed on Jun. 17, 2004, is incorporated in the application.

While the invention has been explained with reference to the specific embodiments of the invention, the explanation is illustrative and the invention is limited only by the appended claims.

What is claimed is:

1. A container holding unit for holding a container by pushing the container, comprising:
   a case having a first guide groove and a second guide groove extending downwardly from a front side toward a rear side,
   an abutting portion disposed in the case for abutting against a circumference of the container, said abutting portion having a first shaft inserted in the first guide groove and a second shaft inserted in the second guide groove so that the abutting portion slides relative to the case along the guide grooves, said abutting portion being arranged in the case rotatably around the first shaft in a direction such that a projection amount of the abutting portion from the case decreases when an upward force is applied to the abutting portion from below, and an urging device disposed between the case and the abutting portion for urging the abutting portion in a direction that the abutting portion projects from the case, and in a direction that the abutting portion returns to an initial position when the abutting portion rotates, wherein said second guide groove has a width greater than that of the first guide groove so that when the abutting portion rotates around the first shaft by the upward force applied thereto, the second shaft moves in the second guide groove to retract the abutting portion inside the case.

2. A container holding unit according to claim 1, wherein said abutting portion includes a triangular portion projecting from the case so that a top of the triangular portion abuts against the circumference of the container and a lower side of the triangular portion situated obliquely shifts to a vertical direction when an upward force is applied.

3. A container holding unit according to claim 1, wherein said first guide groove has a linear portion or a gentle curved portion, and said second guide groove is arranged above the first guide groove and includes a lower portion extending parallel to the first guide groove and an upper portion with a curved shape projecting upwardly.

4. A container holding unit according to claim 1, wherein said urging device includes a wound portion supported inside the abutting portion, a first urging portion extending from an end portion of the wound portion and abutting against an inner surface of the case, and a second urging portion turning from an end portion of the first urging portion and abutting against a corresponding portion of the abutting portion.

5. A container holding unit according to claim 4, wherein said urging device further includes an end extending from the wound portion and contacting the abutting portion.

6. A container holding unit according to claim 1, wherein said case includes two side portions, each having said first and second guide grooves and an inner projection, and a rear portion between the two side portions, said urging device being supported by the inner projections of the side portions.

7. A cup holder device comprising a container receiving portion for receiving the container from above and supporting a bottom surface of the container, and at least one container holding unit according to claim 1 disposed in the container receiving portion.

* * * * *